United States Patent
Rhee et al.

(10) Patent No.: US 6,890,379 B1
(45) Date of Patent: May 10, 2005

(54) COATING COMPOUNDS FOR IMITATION PEARL

(76) Inventors: Young Nam Rhee, 201, Noblehouse, 100-1, BanPo-Dong, SeoCho-Gu, Seoul (KR); Sang Min Rhee, #10, 430 Galleria Dr., San Jose, CA (US) 95134

( * ) Notice: Subject to any disclaimer, the term of this patent is extended or adjusted under 35 U.S.C. 154(b) by 0 days.

(21) Appl. No.: 10/825,195

(22) Filed: Apr. 16, 2004

(51) Int. Cl.$^7$ .......................... C09D 5/36; C09D 101/18
(52) U.S. Cl. .................................... 106/169.3
(58) Field of Search ...................... 106/169.3

(56) References Cited

U.S. PATENT DOCUMENTS

| | | | |
|---|---|---|---|
| 1,868,851 A | * 7/1932 | Rocker et al. | 106/170.49 |
| 1,969,477 A | * 8/1934 | Rittman | 106/169.3 |
| 2,384,493 A | * 9/1945 | Rolle | 427/228 |
| 3,342,686 A | * 9/1967 | Jewel et al. | 424/61 |

* cited by examiner

Primary Examiner—David Brunsman
(74) Attorney, Agent, or Firm—Park & Sutton LLP; John K. Park

(57) ABSTRACT

The present invention relates to compounds for an under coat (A), a mid coat (B) and a top coat (C) of the imitation pearl, in which the compounds for the under and mid coats (A) and (B) of the imitation pearl are prepared by dissolving pyroxylin into a mixed solution of acetone and ethylacetate and another mixed solution of butylacetate and amylacetate, and adding a pigment to the pyroxylin solution, and the compound for the top coat (C) of the imitation pearl is prepared by dissolving pyroxylin into a mixed solution of ethylacetate and butylacetate and adding a pigment to the pyroxylin solution.

3 Claims, No Drawings

COATING COMPOUNDS FOR IMITATION PEARL

BACKGROUND OF THE INVENTION

1. Field of the Invention

The present invention relates in general to coating compounds for an imitation pearl, more particularly, to compounds for an under coat (A), a mid coat (B) and a top coat (C) of the imitation pearl, in which the compounds for the under and mid coats (A) and (B) of the imitation pearl are prepared b dissolving CELLULOID into a mixed solution of acetone and ethylacetate and another mixed solution of butylacetate and amylacetate, and adding a pigment to the CELLULOID solution, and the compound for the top coat (C) of the imitation pearl is prepared by dissolving CELLULOID into a mixed solution of ethylacetate and butylacetate and adding a pigment to the CELLULOID solution. CELLULOID is a registered trademark of the Celluloid Manufacturing Company of Newark, N.J.

Compared to the related art coating compounds for imitation pearls (e.g., basic lead carbonate), the coating compounds of the present invention are nontoxic and environmentally friendly. Also, compared to the typical environmentally friendly compounds like titanium dioxide or ethylacetate compounds, the coating compounds of the invention provide excellent colors and luster to the imitation pearls.

2. Description of the Related Art

Industrial development has brought positive changes on ornaments and raised more interests in accessories. As people live in more comfortable circumstances than the past, their interests in ornaments and accessories have grown naturally.

Imitation pearls are by far the best of all other accessories in that they can be mass produced, and are no way inferior to natural pearls in terms of the texture. Application range of the imitation pearls is also broad, including accessories, necklaces, rings, brooches, toys and so on.

To make imitation pearls for ornamental purposes, cellulose nitrate (or simply, cellulose) is dissolved in diverse solvents, and pigments are added thereto. Then, resin beads are coated with the mixture of the cellulose solution and the pigments.

In the past, basic lead carbonate ($2PbCO_3$ Pb $(OH)_2$), which is a compound of a lead (Pb)-containing neutral salt and a hydroxide, was usually used for the pigment to be added to the cellulose solution. Although the basic lead carbonate was effective for creating almost same texture and luster with natural pearls, it had deadly effects on a human body and was a major environmental contaminant.

To resolve the above-described problems, a new technique has been recently proposed. According to the new technique, cellulose was dissolved in a solvent of acetone or butylacetate, and a harmless pigment bismuthoxychloride (BiOCl), was added to the cellulose solution.

For instance, Korean patent publication No. 1996-13573 (published on Oct. 9, 1996) disclosed a method for manufacturing nontoxic imitation pearls. According to the disclosed method, nitrocellulose is dissolved into acetone, butylacetate, and ethylacetate, and then finished up by titanium dioxide and bismuthoxychloride.

The above method, however, turned out to be disadvantageous because when nitrocellulose itself was used, solubility and dispersibility of pigments for imitational pearls were poor. Also, the imitation pearls made of nitrocellulose were easily turned to yellow because of nitrocellulose being very sensitive to ultraviolet rays. Although there was another technique introduced to get the same texture and physical properties with natural pearls by mixing titanium dioxide with a specific pigment (highlight pearl green), its manufacturing process was very complicated, and matching appropriate components and contents therefor was often failed. As a result, it seemed to be almost impossible to manufacture imitation pearls having gentle and bright colors like natural pearls, and this inferiority only deteriorated merchantability of the imitation pearls. What was worse that final product had 50 ppm of lead, making the imitation pearls toxic to human body.

SUMMARY OF THE INVENTION

It is, therefore, an object of the present invention to provide coating compounds for an imitation pearl that are nontoxic to human body and environmentally friendly, different from the related art coating compounds including basic lead carbonate, and provide better colors and luster to the imitation pearl than the related art coating compounds like titanium dioxide or ethylacetate compounds do.

To achieve the above object, there is provided compounds for an under coat (A), a mid coat (B) and a top coat (C) of the imitation pearl, in which the coating compounds for the under and mid coats (A) and (B) of the imitation pearl are prepared by dissolving pyroxylin into a mixed solution of acetone and ethylacetate and another mixed solution of butylacetate and amylacetate, and adding a pigment to the pyroxylin solution at a designated ratio, and the coating compound for the top coat (C) of the imitation pearl is prepared by dissolving pyroxylin into a mixed solution of ethylacetate and butylacetate and adding a pigment to the pyroxylin solution.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a first example for the preparation of a compound for an under coat (A) of an imitation pearl, pyroxylin (22–33 wt %) is dissolved into a 3:7 of acetone and ethylacetate solution (33–38 wt %) and a 7:3 of butylacetate and amylacetate solution (33–38 wt %), and 1–5 wt % of a pigment is added thereto.

In a second example for the preparation of a compound for a mid coat (B) of the imitation pearl, pyroxylin (22–33 wt %) is dissolved into a 3:7 of acetone and ethylacetate solutions (25–29 wt %) and a 7:3 of butylacetate and amylacetate solution (40–44 wt %) and 1–5 wt % of a pigment is added thereto.

In a third example for the preparation of a compound for a top coat (C) of the imitation pearl, pyroxylin (22–33 wt %) is dissolved into ethylacetate (19–22 wt %) and butylacetate (47–53 wt %), and 01.–1 wt % of a pigment is added thereto.

As for the first and second example, acetone and ethylacetate are preferably mixed together at the ratio of 3:7. This is because when too much of acetone is used, a smell of acetone prevails and the coats dry too fast to balance with other processes. On the contrary, when too much of ethylacetate is used, it takes too long for pyroxylin to completely dissolve into the solution, causing the imitation pearl to lose its own luster.

Therefore, the present invention uses a camphor containing pyroxylin, instead of nitrocellulose, as a plasticizer, and adds to the general solvent for the pyroxylin (composed of acetone, butylacetate, and ethylacetate) a lubricative amylacetate, which is an ester compound of acetic acid and amyl alcohol. By mixing acetone, butylacetate, ethylacetate, and amylacetate at a specific ratio, an optimal condition for manufacturing high quality imitation pearls similar to natural pearls.

Also, as for the first and second examples, butylacetate and amylacetate are preferably mixed together at the ratio 7:3. If necessary, however, butylacetate can be used exclusively.

As for the pigment, a liquid pearl pigment whose main ingredient is bismuthoxychloride is used. If necessary, the liquid pearl pigment can be replaced by carbonate, but it does not have to be titanium dioxide though. Preferably, the pigment particle size is 5–25 $\mu$m.

The following describes more details on how to prepare coating compounds for under-, mid- and top-coats of the imitation pearl.

EXAMPLE 1

Compound for an Under Coat (A)

Added to a 20 liter flask is an 8kg of an original state of pyroxylin chips, 3 kg of acetone, and 7 kg of ethylacetate.

The mixture of pyroxylin chips and ethylacetate is continuously agitated, and 7 kg of butylacetate and 3 kg of amylacetate are added to the flask. By adding butylacetate and amylacetate, the resulting mixture becomes a little sticky.

Afterward, 1.2 kg of a liquid pearl pigment whose main ingredient is bismuthoxychloride is added to the flask to obtain a viscous liquid compound for the under coat of the imitation pearl bead.

EXAMPLE 2

Compound for a Mid Coat (B)

The same method with Example 1 is used, except that 2.4 kg of acetone, 5.6 kg of ethylacetate, 8.4 kg of butylacetate, and 3.6 kg of amylacetate are added to the flask. Later, 1.2 kg of a liquid pearl pigment whose main ingredient is bismuthoxychloride is added to the flask to obtain a coating compound for the mid coat of the imitation pearl bead.

EXAMPLE 3

Compound for a Top Coat (C)

Added to a 20 liter flask is an 8 kg of an original state pyroxylin chips, and 6 kg of ethylacetate.

The mixture of pyroxylin chips and ethylacetate is continuously agitated, and 0.1–1 kg of a liquid pearl pigment whose main ingredient is bismuthoxychloride is added to the flask to obtain a coating compound for the top coat of the imitation pearl bead.

EXAMPLE 4

Application

The imitation pearl bead is immersed in the coating compound for the under coat of Example 1 and dried at 45° C. for 20 minutes. Afterwards, the imitation pearl bead is again immersed in the coating compound for the mid coat of Example 2 and dried.

Finally, the imitation pearl bead is immersed in the coating compound for the top coat of Example 3 and dried, to yield a final product.

Thusly obtained imitation pearl contains below 0.0025 ppm lead, and with the addition of a pigment in a desired color, the imitation pearl has bright and gentle luster just like natural pearls.

Although it is preferable to use the compound for the under coat (A), the compound for the mid coat (B), and the compound for the top coat (C) in sequence, one of the coating compounds can be omitted or one coating compound can be used repeatedly.

For instance, the imitation pearl bead can be coated with only two compounds, namely the compound for the mid coat (B) and the compound for the top coat (C). Also, the imitation pearl bead can be coated only with the compound for the top coat (C) 3–4 times.

There are several ways for coating the bead with the compounds, such as spray, immersion, and painting.

In addition, it is perfectly all right to dissolve the pyroxylin into the solution of acetone or ethylacetate, and to add to the mixture other ingredients at a designated ratio whenever needed.

The mixture ratio is not fixed but adjustable, so ingredients can be added more or less according to different needs.

Although nontoxic bismuthoxychloride is preferred as the pigment, in a certain circumstance, lead carbonate can be used as well.

In conclusion, the imitation pearl coated with compounds for the under coat (A), the mid coat (B) and the top coat (C), in which the compounds for the under and mid coats (A) and (B) are prepared by dissolving pyroxylin into a mixed solution of acetone and ethylacetate and another mixed solution of butylacetate and amylacetate, and adding a pigment to the pyroxylin solution, and the compound for the top coat (C) is prepared by dissolving pyroxylin into a mixed solution of ethylacetate and butylacetate and adding a pigment to the pyroxylin solution, is nontoxic to human body and environmentally friendly. Compared to the related art imitation pearl coated with titanium dioxide or ethylacetate compounds, the imitation pearl of the present invention has excellent colors and luster and thus, can be used in diverse related fields.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A coating compound for an imitation pearl, wherein the coating compound is obtained by dissolving pyroxylin (22–33 wt %) into a 3:7 of acetone and ethylacetate solution (33–38 wt %) and a 7:3 of butylacetate and amylacetate solution (33–38 wt %), and adding 1–5 wt % of a pigment thereto.

2. A coating compound for an imitation pearl, wherein the coating compound is obtained by dissolving pyroxylin (22–33 wt %) into a 3:7 of acetone and ethylacetate solution (25–29 wt %) and a 7:3 of butylacetate and amylacetate solution (40–44 wt %), and adding 1–5 wt % of a pigment thereto.

3. A coating compound for an imitation pearl, wherein the coating compound is obtained by dissolving pyroxylin (22–33 wt %) into ethylacetate (19–22 wt %) and butylacetate (47–53 wt %), and adding 0.1–1 wt % of a pigment thereto.

* * * * *